United States Patent [19]

Rinesch

[11] Patent Number: 4,504,308
[45] Date of Patent: Mar. 12, 1985

[54] METHOD OF OPERATING A METALLURGICAL PLANT

[75] Inventor: Rudolf Rinesch, Linz, Austria

[73] Assignee: Voest-Alpine Aktiengesellschaft, Linz, Austria

[21] Appl. No.: 591,696

[22] Filed: Mar. 21, 1984

[30] Foreign Application Priority Data

Apr. 6, 1983 [AT] Austria .................... 1209/83

[51] Int. Cl.$^3$ ............... C22B 4/00; C21C 5/52
[52] U.S. Cl. .................... 75/10 R; 75/12; 75/65 EB
[58] Field of Search .................... 75/10–12, 75/65 EB

[56] References Cited

U.S. PATENT DOCUMENTS

| | | | |
|---|---|---|---|
| 3,163,521 | 12/1964 | Rinesch | 75/11 |
| 3,292,662 | 12/1966 | Nishi | 138/141 |
| 3,347,766 | 10/1967 | Death | 75/10 R |
| 4,148,628 | 4/1979 | Fukunishi | 75/10 R |
| 4,410,358 | 10/1983 | Heshmatpour | 75/10 R |

Primary Examiner—Peter D. Rosenberg
Attorney, Agent, or Firm—Brumbaugh, Graves, Donohue & Raymond

[57] ABSTRACT

There is disclosed a method of operating a metallurgical plant including a metallurgical vessel through the ceiling of which one or several hollow electrode(s) are guided in whose cavity a supply pipe is liftably and lowerably moveable. The plant may be operated as an electric arc furnace to melt down charge materials and fluxes, by retracting the pipe mouth to behind the mouth of the hollow electrode. Or, it may be operated as a plasma furnace to melt charge materials and fluxes upon increased energy supply, by displacing the mouth of the pipe to or slightly in front of the mouth of the hollow electrode and simultaneously supplying a plasma generating gas. And, finally, it may be operated as a refining converter, by displacing the pipe mouth to beyond the mouth of the hollow electrode and supplying oxygen-containing gas while interrupting the current supply.

7 Claims, 3 Drawing Figures

METHOD OF OPERATING A METALLURGICAL PLANT

BACKGROUND OF THE INVENTION

The invention relates to a method of operating a metallurgical plant comprising a metallurgical vessel, such as a melting furnace or a converter, through the ceiling of which one or several hollow electrode(s) having a cavity are guided, in which cavity a supply pipe is liftably and lowerably moveable.

In order to obtain molten iron by the reduction of iron oxide ore, it was proposed in U.S. Pat. No. 3,163,521 to use a closed vessel provided with a refractory lining and including one or more Söderberg or graphite electrodes projecting through the ceiling of the vessel so as to produce an electric arc, a number of introduction shafts for the reduced material connected to the charging openings of the vessel in a gas-tight manner, and a number of refractorily lined reduction towers corresponding to the number of introduction shafts. From this U.S. patent, it is also known to provide one or more bored-through electrodes and to insert through the bore a liftable and lowerable supply means formed by concentric pipes to convey fuel, oxygen-containing gas and steam. According to the U.S. patent, a gas is produced with properties that do not have an oxidizing effect on iron, which gas is directly supplied to the reduction towers.

When melting low-alloyed and unalloyed scrap in an electric arc furnace, oxygen is an frequently introduced as additional source of energy. This supply of oxygen is able to assist substantially the melt-down process soon after the start of melting, if the $O_2$ jet is directed to the surroundings of the electrodes. In particular, the carbon from the fluxes and silicon, as well as the carbon from the scrap, will burn. It is only when a metal sump has formed and the scrap has been sufficiently heated in the region affected by the oxygen jet that the burning of scrap can efficiently be started.

However, there are cases in which the melt-down process is assisted through the main door or the auxiliary door of the furnace via manually operated self-consuming oxygen lances with low consumption, or by using at least three oil - oxygen burners fixedly installed in the furnace wall between the so-called hot spots or guided through openings in the furnace lid. By these measures, charging times as short as possible are to be achieved, wherein the high transformer outputs, in particular of so called UHP-furnaces (ultra-high power furnaces with connected loads of up to 160 MVA), are to be utilized during almost the total turn-on time.

Manual operation of the oxygen lances results in a strong thermal load, thus increasing the risk of accidents for the operating personnel. The position of the reaction zone is not precisely defined, which may lead to an irregular attack of the refractory furnace lining. Furthermore, according to conventional technologies, the chance of damage to the electrodes cannot be excluded and, finally, the number of lances or burners that may be introduced is very limited.

The invention has as its object to eliminate the described disadvantages and difficulties in metal melting, and to allow the melting and the metallurgical treatment of various steel grades from scrap as well as of directly reduced sponge iron in a single metallurgical vessel in an operationally safe manner and with as low a consumption of energy and time as possible.

SUMMARY OF THE INVENTION

The set object, in a method of the initially described kind, is achieved according to the invention in that optionally (a) by retracting the pipe mouth to behind the mouth of the hollow electrode, the plant is operated as an electric arc furnace to melt down charge materials and fluxes;

(b) by displacing the mouth of the pipe to or slightly in front of the mouth of the hollow electrode and simultaneously supplying a plasma generating gas, the plant is operated as a plasma furnace to melt charge materials and fluxes upon an increased energy supply; or (c) by displacing the pipe mouth to beyond the mouth of the hollow electrode, if desired until immersion into a bath of the melted charge materials, and supplying oxygen-containing gas while interrupting the current supply, the plant is operated as a refining converter.

When operated exclusively as an electric arc furnace, the gas supply pipe is closed and its mouth is slightly retracted—by about 3 to 5 cm—into the hollow electrode so that the latter simultaneously serves as a protection tube for the supply pipe. Between the hollow electrode and the charge materials or fluxes, or melt bath, an electric arc is ignited.

If operated as a plasma furnace, the mouth of the supply pipe is approximately at the same height as the mouth of the hollow electrode or projects out of the latter by a maximum of about 2 cm. Between the hollow electrode and the charge materials, or melt, there is an electric arc, at the same time a plasma generating gas, such as helium, argon and, in particular, oxygen, is supplied via the supply pipe. If oxygen is introduced, the latter serves both as a plasma gas and as a reaction gas.

The mouth of the supply pipe, with this mode of operation, must reach at least as far as to the mouth of the hollow electrode due to the fact that, e.g., oxygen otherwise would react with the electrode material at the mouth of the hollow electrode, thereby burning out its mouth. Hence follows the further requirement for a slight permanent advance of the supply pipe in order to compensate for its burn-up at the mouth and thereby prevent a burning out of the hollow electrode.

Due to the high temperature of the plasma generated, the energy portion directly transferred by radiation onto the charge or melt becomes larger, the melt-down periods becoming accordingly shorter and the energy utilization is improved, (because less heat is given off to the furnace walls). A sump of molten metal at first forms in the center of the furnace space such that the not yet melted part of the charge, which is peripherally on the furnace wall, constitutes an additional protection of the brickwork over quite a long period of time and is being preheated by the radiation heat until it sinks into the melt bath.

If the metallurgical plant is used for refining, the mouth of the supply pipe projects out of the hollow electrode by at least about 10 cm, no electric-arc discharge being maintained during the blowing procedure. Oxygen-containing gas or pure oxygen is top-blown onto the bath or blown into the same.

According to a preferred embodiment of the method according to the invention, technically pure oxygen gas is blown in through the supply pipes to below the surface of the bath of the melted charging substances, if operated as a refining converter.

The unavoidable burn-up of the supply pipe is compensated by continuously advancing the pipe through the hollow electrode, the hollow electrode simultaneously functioning as a protection tube for the upper part of the supply pipe.

Suitably, a self-consuming lance of refractorily sheathed steel pipe is used as supply pipe. Lances of this kind are known. Most frequently, they are comprised of unalloyed steel. The sheathing of refractory material should not be too thick, since a thick cover is not very resistant to mechanic stresses and thus may easily become destroyed. Moreover, thickly sheathed lances have a considerable weight and are, therefore, extremely difficult to handle. Particularly suited are so called "calorized" lances, i.e., pipes of unalloyed steel that were heated to about 1,000° C. in aluminum powder. By this treatment, the aluminum diffuses into the steel with the formation of a surface layer of an Al-Fe alloy. At high temperatures, a thin film of refractory aluminum oxide forms on the calorized surfaces. Preferably, the lances may be calorized on their inner and outer sides; at approximately equal weights, their service lives are about 3 to 10 times longer than those of unsheathed self-consuming lances, depending on the charging conditions. A further development of calorized lances with additional refractory covers is described in U.S. Pat. No. 3,292,662.

According to a further preferred embodiment, carbon carriers and/or fine-particle fluxes are introduced through at least one supply pipe from case to case.

Thus, coal dust may, for instance, be blown in with a conveying gas, if required.

BRIEF DESCRIPTION OF THE DRAWINGS

The invention will now be explained in more detail by way of one embodiment comprising three hollow electrodes and with reference to the accompanying drawing, wherein.

DESCRIPTION OF EXEMPLARY EMBODIMENT

Figure 1:
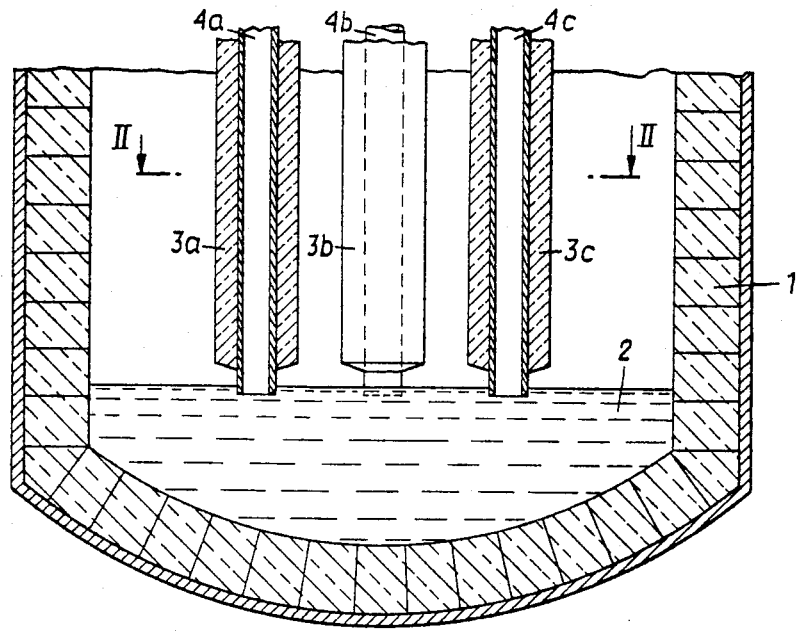
FIG. 1 illustrates schematically in section a metallurgical vessel including hollow electrodes, with the lid being removed.
Figure 2:
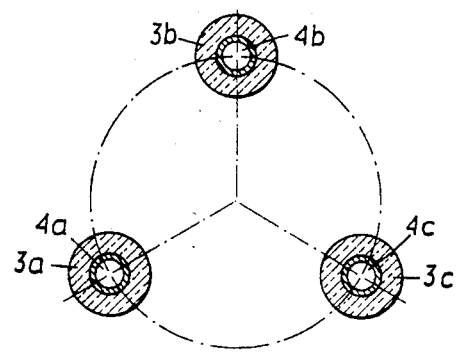
FIG. 2 is a section through the electrode arrangement along line II—II of FIG. 1.

The refractorily lined wall of a metallurgical vessel is denoted by 1 in FIG. 1. Above the level of the bath 2 of melted charging substances, there are three perpendicularly arranged cylindrical hollow electrodes 3a, 3b, 3c of coaly rammed mass or graphite, whose axes extend through the corners of an equilateral triangle to whose plane they are normal (FIG. 2).

The mouths of the gas supply pipes 4a, 4b, 4c liftably and lowerably movable in the hollow electrodes are illustrated in a manner displaced so much beyond the mouths of the hollow electrodes that they project as far as to below the surface of the bath 2. In this advanced position of the supply pipes, the plant is operated as a refining converter, a very thorough mixing of the bath being achieved on account of the simultaneous blowing in of oxygen. An irregular attack on the lining of the metallurgical vessel does not occur, nor does a damage to the electrodes. The hollow electrode acts as an additional protective sheath over a certain length of the supply pipes.

Figure 3:
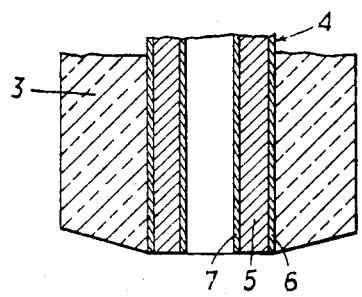
FIG. 3 is an enlarged section of the mouth region of a hollow electrode, with the gas supply pipe displaceable therein being in a position suited for operation of the plant as a plasma furnace.

In FIG. 3, the mouth of a supply pipe generally denoted by 4 is illustrated, which is just at the height of the mouth of the hollow electrode. The supply pipe is comprised of a core pipe 5 of unalloyed steel on whose outer and inner generated surfaces a layer (6, 7) of refractroy material is each applied.

If, in this position of the supply pipe, a suitable plasma generating gas is blown into the electric arc burning between the hollow electrode and the charging material or melt, the melt-down period or overheating period can be substantially shortened.

Due to the geometrically regular disposition of the hollow electrodes with the pipes guided therein, melting of the charge takes place more uniformly.

The supply pipes are axially displaceable in the hollow electrodes at any desired point of time so that the latter can be fed with, for instance, oxygen immediately on demand.

When melting unalloyed or low-alloyed steel grades with oxygen supply, substantially more carbon must be added to the charged scrap than with conventional melting. Additional heat is created by the burning of carbon. Thereby, the furnace atmosphere gets oxidizing, at least locally. Therefore, it is necessary also for this reason to provide substantially more coal in dissolved or undissolved form to the charge in order to reach the intake carbon content necessary to realize refining. The amount of the required additional carbon may be estimated for the intended oxygen addition. These additional amounts of carbon are placed on the furnace bottom in the form of coke prior to the introduction of the remaining charge. If required, carbon carriers—for instance in the form of coal dust—may be directly post-charged through at least one supply pipe.

The blowing in of oxygen results in that, at the beginning of melting, the refining procedures already simultaneously start taking place partially. After a melting time of about 10 to 20 min, the necessary temperatures have been reached in the region of the electrodes. Now, concerted blowing in of oxygen according to mode of operation (b) of the method according to the invention may be started. The oxygen impinges on the red hot scrap, burning iron and —as far as contained therein—carbon. In addition, a very hot plasma is generated.

The carbon monoxide forming is burnt into carbon dioxide only for part. The iron(II) oxide forming partially is oxidized into iron(III) oxide and again reduced by carbon and iron in the sump formed in the bottom region by the melt-down effect of the electrodes. Also the iron (II) oxide is again partially reduced by the high carbon excess of the coke used on the hearth.

With melting down progressing, the reduction of the iron oxides of the slag is connected with the formation of a heavily agitated foaming slag, which may be regarded as a characteristic of a good dephosphorization. The slag volume, as compared to the volume of the steel bath, has substantially increased and by its agitation ensures that new slag amounts are always moved to the reaction surface slag/metal-bath. This procedure is even more favored by top-blowing of oxygen.

The heat released at the combustion of iron and carbon to a major extent is given off to the surrounding charge. The oxygen excess still present burns the carbon monoxide within the scrap, which stems from the reaction of the melt droplets with the coke, at least partially into carbon dioxide. The interplay of melting effect, refining effect and bath agitation caused by the action of the oxygen jet is of a particular importance to the metallurgical process. Therefore, the operation of the plant must be controlled such that the start of melting nearly coincides with the start of refining. The permanently occurring interaction of oxidation and reduction takes effect in a strong and thorough mixing of the charge, accompanied by a heavy agitation of the bath. The amount of carbon refined out may be considered the measure for the intensity of boiling.

A prerequisite to carry out dephosphorization at an earlier point of time is the prematurely induced readiness of the slag to react, which slag must be liquid and contain dissolved free lime.

If a sufficient amount of lime is added to the charge, the prerequisites for a quick dephosphorization are, therefore, met simultaneously with the partially effected burning of scrap. The heat development in the burning spot of the oxygen jet occurs in the immediate vicinity of the slag formers. After formation of the melt sump, the rapid heat transmission from the metal bath to the slag on account of the intensive refining reaction must be taken into consideration, too. The efficiency of the newly formed slag, with respect to the phosphorus-oxidizing ability, rises the higher the content of iron(II) oxide and the lower the temperature.

Decarburization at this melting stage only is of relevance in terms of an intensification of the bath agitation and in order not to allow the iron content of the slag to rise too much.

After drawing off the melt-down slag, the extent of the phosphorus content need no longer be taken into account, i.e., the decarburization reaction may be initiated and carried out at once by means of gaseous oxygen.

The early realization of desulphurization during the melt-down period also is of relevance with the described course of procedures. For desulphurization, the premature availability of free lime in the slag and thus the sulphur distribution between bath and slag are of great importance.

The reaction conditions under which the two processes, i.e., the transition of sulphur from the metal phase into the slag phase and the elimination of sulphur from the slag via the gaseous phase, take place run counter. The transition of sulphur from the metal bath into the slag is promoted by the increasing basicity and decreasing oxidation potential of the slag, by increasing temperatures as well as by an increase in the interfaces between metal and slag phases on account of a heavy bath agitation.

The slag gas desulphurization is promoted by an increasing oxidation potential and a decreasing basicity of the slag, by an increasing temperature and a strong bath agitation.

The effects of basicity and oxidation potential as principial influential factors also run counter. The efficacy of the oxygen jet results from the interference of these two processes.

The furnace atmosphere, with the usual electric steel method, is a reducing one during the melt-down phase. This fact, which was previously considered a substantial advantage of electric furnaces, has lost considerable importance due to the substitution of precipitation deoxidation for diffusion deoxidation. When melting down with the assistance of oxygen, the furnace atmosphere is strongly oxidizing, at least locally. Nevertheless, the initial state of the melt is nearly the same after melting down of the scrap. Nor are there any evident differences during and after the refining stage with respect to the further course of the oxygen concentrations. An over-deoxidation of the metal bath cannot occur as long as a sufficient amount of dissolved and undissolved carbon is present in the charge. This carbon amount thus furnishes the major part of the fuel for the method on the one hand and, on the other hand, it is a protection against over-deoxidation and the prerequisite for reaching the desired carbon content of the melt-down sample.

When melting unalloyed steel grades, the melt-down and the refining phases are thus shortened according to the invention by the supply of oxygen.

A melt of high-alloyed scrap must be refined with oxygen in order to bring about the necessary extensive decarburization. Economical remelting of high-alloyed scrap thus is not possible in a basic electric-arc furnace without oxygen supply, since the yield of remelted high-alloyed steel at the oxidation of the melt by means of iron oxides contained in the slag is considerably smaller.

Those alloying elements of the steel bath that are less precious than iron are to be protected against oxidation as far as possible. A deposition of phosphorus, however, is not possible with higher contents of chromium or manganese. The phosphorus content of the charge thus must not exceed the required phosphorus content of the remelted product.

The affinity of carbon to oxygen rises with an increasing temperature of the bath, whereas the oxygen affinity of the alloying elements oxidizable in iron-rich melts decreases with an increasing bath temperature. Therefore, it is to be sought to increase the temperature of the bath as quickly as possible. Since the combustion heat of the alloying elements is released during oxygen refining, the oxygen amount available per time unit is to be adjusted as high as possible for this purpose, yet refining must be stopped immediately as the desired final carbon content has been reached.

In order to further improve the yield of alloys from scrap, a partial reduction of the heavy-metal oxides contained in the slag is effected by sprinkling on reductants after oxygen-refining of alloyed steels. With high-carburized steels, coke breeze may be used therefor, while with low-carburized, soft steels fine-grained ferrosilicon, aluminum or silicochromium is sprinkled on the slag.

When melting high-alloyed steels from scrap of the same kind, the concerted application of oxygen thus is of greatest importance.

According to the method of the invention, the operation state of a metallurgical plant can be excellently controlled. Oxygen, a plasma generating gas or, if necessary, reductants may be introduced through the supply pipes at any time.

If directly reduced iron ore (iron sponge) is melted, a separation of melt-down period and refining period is not possible, because both processes run practically simultaneously. The reason for this behavior resides in the residual oxygen content of the sponge and in the carbon contained in the liquid bath at the same time.

The two elements, on account of their reaction into carbon monoxide, ensure a permanent bath agitation. To observe optimum conditions, the oxygen and carbon contents must be accurately adjusted relative to each other. If the two elements are not contained in the right proportion already in the iron sponge, one of them must be supplied to the liquid bath. This may again be effected through the supply pipes displaceable in the hollow electrodes.

Iron sponge may be melted continuously
in the liquid bath or
in the electrode craters.

A combination of these modes of operation with stepless transition is particularly advantageous.

If a short electric arc is adjusted at the start of melting, to which oxygen is supplied, craters will form soon. A portion of the iron sponge can be continuously introduced into these craters via the supply pipes. The supply rate is adjusted such that it is only after termination of the iron sponge supply that a scrap jacket protecting the furnace wall has been melted. At this point of time, either the remaining iron sponge is added at a usual supply rate or scrap is charged anew, in a stepless transition.

The selection of the modes of operation and the charging of fluxes and of iron sponge according to the method of the invention is effected easily and quickly.

The burning stability of the arc of electric furnaces is determined by the electric values of the furnace plant, yet it is adversely affected by operational fluctuations due to changes of resistance by the scrap shifts during melting and the changes of ionisation of the electric arc caused by chemical processes. These permanent changes lead to an instability of the electric arc. This behavior of the electric arc is to be observed, in particular, with furnaces comprising full electrodes. Electric arcs emanating from hollow electrodes are much more stable and, moreover, remain directed approximately perpendicular to the bath surface. An electric arc tends to ignite at the inner edge of the hollow electrode, this bore having to be wide enough so that the electric arc does not spark over to the outer part of the electrode.

If the metallurgical plant is operated as a plasma furnace according to the invention by displacing the mouth of the supply pipe and simultaneously supplying a plasma generating gas, the stability of the discharge is even more increased by the generation of an extremely hot plasma.

What I claim is:

1. A method of operating a metallurgical plant including a metallurgical vessel having a ceiling, at least one hollow electrode guided through said ceiling, said hollow electrode defining an electrode cavity and having an electrode mouth, and a supply pipe having a pipe mouth and being vertically displaceable in said electrode cavity, comprising the steps of selectively operating said plant as one of an electric arc furnace, a plasma furnace and a refining converter by disposing said supply pipe with said pipe mouth in said hollow electrode behind said electrode mouth, and supplying current to said electrode, when said metallurgical vessel is operated as an electric arc furnace for melting charging substances and fluxes, disposing said supply pipe with said mouth in the region of said electrode mouth, supplying a plasma generating gas to said metallurgical vessel through said supply pipe, and supplying current to said electrode, when said metallurgical vessel is operated as a plasma furnace for melting charging substances and fluxes with an increased energy supply, and disposing said supply pipe with said supply mouth projecting outside said hollow electrode beyond said electrode mouth, and supplying oxygen-containing gas through said supply pipe without current being supplied to said electrode, when said metallurgical vessel is operated as a refining converter.

2. A method as set forth in claim 1, wherein said metallurgical plant is operated as a plasma furnace and said pipe mouth is displaced as far as to said electrode mouth.

3. A method as set forth in claim 1, wherein said metallurgical plant is operated as a plasma furnace and said pipe mouth is displaced slightly in front of said electrode mouth.

4. A method as set forth in claim 1, wherein said metallurgical plant is operated as a refining converter and said pipe mouth is displaced until immersion into a bath of said melted charging substances.

5. A method as set forth in claim 1, wherein a self-consuming lance of refractorily sheathed steel pipe is used for said supply pipe.

6. A method as set forth in claim 1, further comprising introducing, from case to case, at least one of carbon carriers and fine-particle fluxes through at least one supply pipe.

7. A method as set forth in claim 1, wherein said metallurgical plant is operated as a refining converter and technically pure oxygen gas is blown in through said supply pipes to below the surface of a bath of said melted charging substances.

* * * * *